United States Patent
Sjöblom et al.

(10) Patent No.: US 11,953,388 B2
(45) Date of Patent: Apr. 9, 2024

(54) METALLIC TUBE STRUCTURE WITH A SENSOR ARRANGEMENT

(71) Applicant: ALLEIMA TUBE AB, Sandviken (SE)

(72) Inventors: Gustaf Sjöblom, Gävle (SE); Anthony Ewert, Tierp (SE)

(73) Assignee: Alleima Tube AB, Sandviken (SE)

(*) Notice: Subject to any disclaimer, the term of this patent is extended or adjusted under 35 U.S.C. 154(b) by 648 days.

(21) Appl. No.: 16/972,929

(22) PCT Filed: May 13, 2019

(86) PCT No.: PCT/EP2019/062171
§ 371 (c)(1),
(2) Date: Dec. 7, 2020

(87) PCT Pub. No.: WO2019/219586
PCT Pub. Date: Nov. 21, 2019

(65) Prior Publication Data
US 2021/0310884 A1    Oct. 7, 2021

(30) Foreign Application Priority Data

May 16, 2018  (EP) .................................... 18172529

(51) Int. Cl.
*G01L 1/22*    (2006.01)
*G01K 7/02*    (2021.01)
(Continued)

(52) U.S. Cl.
CPC .............. *G01L 1/2206* (2013.01); *G01K 7/02* (2013.01); *G01K 13/024* (2021.01); *G01L 1/142* (2013.01)

(58) Field of Classification Search
CPC ......... G01L 1/2206; G01L 1/142; G01K 7/02; G01K 13/024; G01K 7/04; G01K 13/026; G01D 21/00; G01D 1/00
(Continued)

(56) References Cited

U.S. PATENT DOCUMENTS 4,391,147 A * 7/1983 Krempl ................ G01L 9/0001
                                                        73/730
5,108,819 A   4/1992 Heller et al.
(Continued)

FOREIGN PATENT DOCUMENTS

CN      102038493 A      5/2011
CN      106644130 A  *   5/2017
(Continued)

OTHER PUBLICATIONS

International Search Report and Written Opinion dated Jun. 21, 2019, issued in corresponding International Patent Application No. PCT/EP2019/062171.

*Primary Examiner* — Robert R Raevis
(74) *Attorney, Agent, or Firm* — Morgan, Lewis & Bockius LLP (57) ABSTRACT

Metallic tube structure comprises a first tubular portion and a sensor structure. A sensor of the sensor structure is configured to detect a physical parameter of the metallic tube structure. The sensor structure is formed as a stack of thin-film layers. The stack comprises at least a first electrically insulating thin-film layer and at least one electrically conducting thin-film layer. The first electrically insulating thin-film layer is in mechanically bonded to the outer surface of the first tubular portion and is arranged to electrically insulate the at least one electrically conducting thin-film layer from the first tubular portion. A portion of the sensor structure is covered by a protective member, the protective (Continued)

member being arranged in direct contact with the at least a portion of the sensor structure and at least a part of the first tubular portion.

26 Claims, 2 Drawing Sheets

(51) Int. Cl.
*G01K 13/024* (2021.01)
*G01L 1/14* (2006.01)

(58) Field of Classification Search
USPC .... 73/775, 779, 780, 862.321–862.339, 649, 73/658–660, 730; 374/141–144, 147, 374/179, 208
See application file for complete search history.

(56) References Cited

U.S. PATENT DOCUMENTS

| | | | |
|---|---|---|---|
| 6,014,073 | A | 1/2000 | Torii et al. |
| 2001/0053172 | A1* | 12/2001 | Sakowsky .............. G01K 1/143 |
| | | | 374/E1.019 |
| 2020/0025339 | A1 | 1/2020 | Rauffmann et al. |

FOREIGN PATENT DOCUMENTS

| | | |
|---|---|---|
| DE | 10 2015 122296 A1 | 6/2017 |
| JP | 2017-161332 A | 9/2017 |
| KR | 101960030 B1 * | 3/2019 |
| WO | 2017/102227 A1 | 6/2017 |

\* cited by examiner

METALLIC TUBE STRUCTURE WITH A SENSOR ARRANGEMENT

TECHNICAL FIELD

The present disclosure relates to a metallic tube structure having a thin-film sensor. The metallic tube structure is to be used in high temperature applications and operations such as for temperatures above 300° C. More particularly, the present disclosure relates to a metallic tube structure with at least one thin-film sensor provided on a metallic tube, which may be integrated in a tube system without affecting the fluid flow in the tube system.

BACKGROUND

Metallic tubes are used in many different applications within different industries. In many of those applications, the tubes are exposed to different stresses, strains, and/or corrosive compounds/compositions which may cause local weakening of the metallic tube and thereby may lead to failure. This in turn may lead to replacement of tubes and to an increase in costs. In some cases, sensors are therefore attached to these tubes, which sensors are utilised for monitoring the tubes. However, it is very difficult to protect the sensor in the tube against environmental impact.

WO 2017/102227 discloses a method for manufacturing a tube of metal. Sensors are attached to the metal tube, which sensors register and signal e.g. physical parameters of the tube, such as temperature and/or strain. The sensors are protected against environmental influences. The sensors and signal lines to the sensors are protectively mounted in a drawn groove in the tube. The mounting of sensors and signal lines in the groove involves a significant amount of manual work. Furthermore, the mounting of sensors, such as strain gauges, in the groove is complicated and requires a significant amount of experience and precision work. The traditional use of thin-film sensors within the art relies on using an adhesive for mounting the sensor to the tube, this means that the use of thin-film sensors is restricted to temperatures below 300 degrees C. Furthermore, it is very hard to achieve a mounting method using an adhesive. For example, a strain gauge requires a very precise gluing in order to transfer the strain to the sensor Therefore, there is a need for a tube with integrated sensors and signal lines that can withstand high temperature, such as above 300° C. and harsh environment.

Thus, there is still a need for further improvements.

SUMMARY

The present disclosure provides a metallic tube structure which may be manufactured with industrial processes, such as with an automated process, i.e. with a process requiring less human intervention and less human time to deliver. This disclosure provides a metallic tube structure which preferably is used as a tube for fluid transport, such as steam or liquid. The disclosed metallic tube structure may also be used as a tube which is used as a structural element, such as tubes used in bridges and other constructions. Since the disclosed metallic tube structure involves thin-film technology and no manual application of glue or routing of signal lines, the metallic tube structure is suitable to be produced by using an industrial process, such as an automated process for example using robots.

According to one embodiment, a tube should be interpreted as a structure used as either a load bearing element and/or as a fluid transport element.

According to an aspect of the invention, this is achieved by a metallic tube structure having a longitudinal extension. The metallic tube structure comprises a first tubular portion having an inner surface and an outer surface, wherein the first tubular portion is made of a metal, and a sensor structure comprising at least one sensor and at least one sensor signal line, the at least one sensor being connected to the at least one sensor signal line. The at least one sensor is configured to detect a physical parameter of the first tubular portion. The sensor structure is arranged longitudinally on at least a part of the outer surface of the first tubular portion.

Further, the sensor structure is formed as a stack of thin-film layers, wherein the stack comprises at least a first electrically insulating thin-film layer and at least one electrically conducting thin-film layer, wherein the first electrically insulating thin-film layer is mechanically bonded to the outer surface of the first tubular portion, wherein at least the first electrically insulating thin-film layer is arranged to electrically insulate the at least one electrically conducting thin-film layer from the first tubular portion, wherein the at least one sensor signal line extends along at least a part of the outer surface, wherein the at least one sensor signal line extends in the stack, and wherein at least a portion of the sensor structure is covered by a protective member, the protective member being arranged in direct contact with the at least a portion of the sensor structure and at least a part of the first tubular portion. The thin-film layers of the sensor structure are typically heat resistant.

Since in such a metallic tube structure, the sensor structure, which comprises the at least one sensor and the at least one sensor signal line, is formed as a stack of thin-film layers, and since at least a portion of the sensor structure is covered by the protective member, manufacturing of the metallic tube structure in an industrial process is possible. Moreover, such a metallic tube structure is mechanically rigid due to the sensor structure being formed as a stack of thin-film layers and the protective member. Furthermore, the first electrically insulating thin-film layer is mechanically bonded to the outer surface of the first tubular element. This allows for a secure and reliable reading of at least one physical property of the first tubular element since the sensor structure is mechanically bonded to the outer surface of the first tubular portion. This also enables that the sensor structure can be used during high temperature application and operation as the sensor structure has been attached to the first tubular portion without the use of an adhesive.

In the present application the term "mechanically bonded" is intended to be interpreted as mechanically interlocked. For example, the first electrically insulating layer is mechanically bonded to the outer surface of the first tubular portion. This means that first electrically insulating layer mechanically engage the outer surface of the first tubular portion. In some cases, a bond layer may be used, which preferably is a metallic bond layer such as a metal alloy comprising chromium and/or nickel.

Accordingly, there is provided a metallic tube structure with a thin-film sensor on the outer surface of the first tubular portion. The thin-film sensor simplifies the integration of a sensor in or on the tube wall of the metallic tube structure. Also, the present disclosure provides a metallic tube structure comprising a sensor structure with at least one sensor wherein said sensor structure has been adapted for being produced by using an industrial process, such as an industrial automated process.

More specifically, the present disclosure provides a sensor structure formed as a stack of thin-film layers which may be formed on the first tubular portion in an industrial process. Also, the protective member can be arranged in an industrial process over at least a portion of the sensors structure and the first tubular portion. The industrial process for arranging the protective member may comprise the steps of thermal spraying or drawing operations.

The stack of thin-film layers is mechanically bonded to the first tubular portion and the protective member is arranged in direct contact (for example no voids affecting the heat transfer) with at least a portion of the sensor structure and the at least part of the first tubular portion. This will provide for good thermal conductivity between the first tubular portion and the protective member. Air pockets or pockets filled with glue may be avoided between the protective member and the first tubular portion. Moreover, since the stack of thin-film layers is mechanically bonded to the first tubular portion, good thermal conductivity may be provided between the first tubular portion and the stack of thin-film layers including the at least one sensor. Stress, in the form of elongation and contraction of the outer surface of the first tubular portion, is transferred from the first tubular portion to the at least one sensor. The at least one sensor may for instance be selected from a temperature sensor, or a strain sensor, or combinations thereof.

The protective member will protect the sensor structure against wear and rough handling. Accordingly, in some embodiments, the protective member only needs to cover a portion of the sensor structure, thus the portion which is subjected to rough handling, e.g. when installing the metallic tube structure in a piece of equipment, remaining parts of the sensor structure may be arranged exposed on the outer surface of the first tubular portion. In other embodiments, however, the protective member may substantially cover the entire sensor structure or the whole sensor structure. The protective member may be considerably thicker in a radial direction of the metallic tube structure than the stack of thin-film layers. Both the first tubular portion and the protective member are composed of a metal or a metal alloy. The first tubular portion and the protective member may comprise the same metal or metal alloy or they may comprise different metals or metal alloys.

As such, thin-film technology is well known and used e.g. for producing thin metal coatings, electronic semiconducting devices, hard coatings on cutting tools, and solar cells.

According to embodiments, the at least one sensor may be formed by the at least one electrically conducting thin-film layer, and wherein the at least one signal line may be formed by the at least one electrically conducting thin-film layer. In this manner, the at least one sensor and the at least one signal line may be manufactured in an automated manufacturing process. Thus, the at least one sensor and the at least one signal line are formed in the same industrial process. This means that the sensor and the signal lines are formed in the thin-film stack and thereby the step of manually connecting signal lines to the sensor may be omitted.

According to embodiments, the wall thickness of the first tubular element may be constant in a tangential direction of the first tubular portion. This will allow the use of the metallic tube structure in an industrial tube system with pressurized operation since there is no local tangential weakening of the tube wall.

According to embodiments, the sensor structure may comprise a second electrically insulating thin-film layer, and wherein the second electrically insulating thin-film layer may be arranged between the protective member and at least one of the at least one sensor and the at least one sensor signal line whereby an electrical insulator is formed between the protective member and the at least one of the at least one sensor and the at least one signal line. In this manner, the at least one sensor and the at least one sensor signal line may be electrically insulated from the first tubular portion.

According to embodiments, the protective member may comprise a second tubular portion extending around the first tubular portion, wherein the second tubular portion is made of a metal or a metal alloy which may be the same or different compared with the first tubular portion and/or protective member. Thus, the second tubular portion may be drawn onto the first tubular portion, or the second tubular portion may be shrink-fitted onto the first tubular portion. In this manner, manufacturing process steps for securing the second tubular portion onto the first tubular portion are provided. Such manufacturing process steps may be performed in automated manufacturing processes. Furthermore, this will also provide good thermal connection between the first and second tubular portion.

According to embodiments, the second tubular portion may extend along the at least one sensor and along at least part of the at least one sensor signal line. In this manner, the at least one sensor and at least part of the at least one sensor signal line may be protected against wear and rough handling.

According to embodiments, the protective member may comprise a segment element extending partially around the first tubular portion. In this manner, a protective member may be provided, which requires less material than a full tubular portion extending around the first tubular portion. Also, the segment element may be positioned and secured to the first tubular portion in an automated manufacturing process.

According to embodiments, the segment element may be formed by thermal spraying. In this manner, the segment element may be manufactured in an automated manufacturing process.

According to embodiments, an end portion of the at least one sensor signal line may be exposed. In this manner, the exposed end portion may be accessible for connecting the at least one sensor signal line to electrical equipment, e.g. via an electrical conduit. The end portion of the at least one signal line being exposed means that the end portion is neither covered by the protective member nor by any second electrically insulating thin-film layer. Thus, the end portion of the at least one sensor signal line is uncovered.

According to embodiments, the end portion of the at least one sensor signal line may be arranged exposed on the first tubular portion. In this manner, the end portion of the at least one sensor signal line may be accessible on the first tubular portion.

According to embodiments, the sensor structure may comprise a contact member extending from the metallic tube structure, wherein a portion of the at least one sensor signal line may extend along the contact member, and wherein the end portion of the at least one sensor signal line may be arranged exposed on the contact member. In this manner, the contact member may be utilised for connecting the at least one signal line to electrical equipment. Such a contact member, and accordingly the portion of the at least one sensor signal line extending along the contact member, may be physically more easily accessible for connection than the at least one sensor signal line extending along the first tubular portion.

According to embodiments, the at least one sensor may be composed of a metal alloy comprising chromium and palladium, or chromium and platinum, or chromium and nickel. In this manner, a durable and precise sensor may be provided. These materials may be e.g. exposed to high temperatures while maintaining a proper function of the at least one sensor. Furthermore, these materials are suitable for use in a strain gauge sensor.

According to embodiments, the electrically insulating thin-film layer may be composed of an oxide and/or a nitride. In this manner, a durable sensor structure may be provided. For instance, oxides and nitrites may provide good electrical insulation properties also during high temperature conditions and also provide good dielectric properties to the sensor structure. An example of an oxide but not limited thereto is $SiO_2$. The nitride may for instance be selected from $Si_3N_4$.

Further features and advantages will become apparent when studying the appended claims and the following detailed description.

BRIEF DESCRIPTION OF THE DRAWINGS

Various aspects and/or embodiments of the present disclosure, including its particular features and advantages, will be readily understood from the example embodiments discussed in the following detailed description and the accompanying drawings, in which.

DETAILED DESCRIPTION

Aspects and/or embodiments of the present disclosure will now be described more fully. Like numbers refer to like elements throughout. Well-known functions or constructions will not necessarily be described in detail for brevity and/or clarity.

Figure 1:
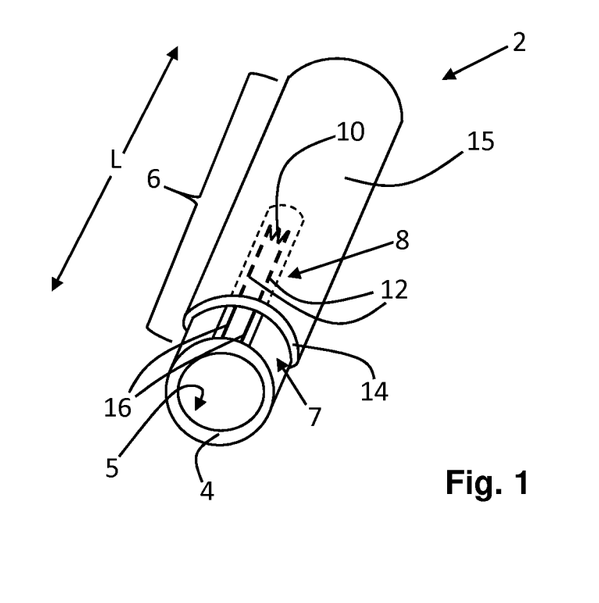
FIGS. 1 and 2 illustrate metallic tube structures according to embodiments.

FIG. 1 illustrates a metallic tube structure 2 according to embodiments. The metallic tube structure 2 has a longitudinal extension L. The metallic tube structure 2 comprises a first tubular portion 4 having an inner surface 5 and an outer surface 7.

The metallic tube structure 2 further comprises a sensor structure 8. The sensor structure 8 comprises at least one sensor 10 and at least one sensor signal line 12. In FIG. 1 part of the sensor structure 8, the at least one sensor 10, and the at least one sensor signal line 12 are indicated with broken lines. The at least one sensor 10 is connected to the at least one sensor signal line 12. The at least one sensor 10 is configured to detect a physical parameter of the metallic tube structure 2. The at least one sensor signal line 12 is configured for connecting the at least one sensor 10 to external equipment. The at least one sensor signal line 12 may in particular be configured for electrically connecting the at least one sensor 10 to external equipment. Depending on the type of sensor 10, e.g. an electric voltage may be applied across the at least one sensor 10, and/or an electric voltage across the at least one sensor 10 may be measured. Such application and/or measuring of voltage may be provided by the external equipment.

Thus, a metallic tube structure 2 is provided which may be used for monitoring a physical parameter of the metallic tube structure. Accordingly, the relevant apparatus, and/or process equipment, and/or process may be monitored directly or indirectly via the at least one sensor 10 provided in the sensor structure 8 of the metallic tube structure 2.

Mentioned purely as some examples: The physical parameter of the metallic tube structure 2 may be a temperature of the first tubular portion 4. The physical parameter of the metallic tube structure 2 may be strain in the first tubular portion 4.

The metallic tube structure 2 may form the entire length of a metallic tube required in the relevant apparatus, and/or process equipment, and/or process. Alternatively, the metallic tube structure 2 may form part of a longer tube, i.e. the metallic tube structure 2 is joined with one or more tube portions to form the required length of tube.

The sensor structure 8 is arranged longitudinally on at least a part of the outer surface 7 of the first tubular portion 4. That is, the sensors structure 8 extends in the longitudinal extension L of the metallic tube structure 2. The at least one sensor 10 is arranged at the outer surface 7 of the first tubular portion 4. The at least one sensor signal line 12 extends along at least a part of the outer surface 7 of the first tubular portion 4. Thus, the at least one sensor 10 may be provided at a particular position of the metallic tube structure 2, suitably a position where the relevant physical parameter is to be detected. The at least one sensor signal line 12 forms an electrical connection to the at least one sensor 10. The at least one sensor signal line 12 may extend along a shorter or longer distance along the longitudinal extension L, depending on where along the metallic tube structure 2, the sensor structure 8 is connected to external electrical equipment. Mentioned purely as an example, the at least one sensor signal line 12 may have a length within a range of some centimetres up to one or more metres.

In these embodiments, two sensor signal lines 12 and one sensor 10 are shown. Each of the sensor signal lines 12 is connected to the sensor 10. According to alternative embodiments, there may be provided more than one sensor 10. Depending on the number and type of sensors 10, there may be provided more than two signal sensor lines 12, e.g. three or more sensor signal lines.

The metallic tube structure 2 comprises a protective member 14. The protective member 14 is configured to protect at least a portion of the sensor structure 8 from, e.g. one or more of wear, rough handling, heat, etc. For instance, the protective member 14 may protected the sensor structure 8 from being subjected to high temperatures during use of the metallic tube structure 2. The metallic tube structure 2 may be e.g. subjected to combustion gases, and/or superheated steam, just to mention two uses of the metallic tube structure 2. In a further example, the protective member 14 may protect the sensor structure 8 from damage during installation of the metallic tube structure 2 in an apparatus and/or process equipment. For instance, the metallic tube structure 2 may lead through a wall or into a larger diameter tube. In such feedthroughs, an exposed sensor structure 8, i.e. not covered by the protective member 14, would be subjected to abrasion and wear. If the metallic tube structure 2 is welded to the wall or larger diameter tube at such feedthroughs, the protective member 14 may provide a weldable portion of the metallic tube structure 2, protecting the sensor structure 8 beneath.

The protective member 14 as defined hereinabove or hereinafter may have a number of different geometrical shapes, some of which are discussed herein with respect to different embodiments, see also FIG. 2. The protective members 14 according to the different embodiments have in common that at the least a portion of the sensor structure 8 is covered by the protective member 14, and that the protective member 14 is arranged in direct contact with at least a portion of the sensor structure 8 and at least a part of the first tubular portion 4.

In the embodiments of FIG. 1, at least a portion of the sensor structure 8 is covered by a protective member 14, the protective member 14, is arranged in direct contact with the at least a portion of the sensor structure 8 and at least a part of the first tubular portion 4. The protective member 14 extends a first distance 6 along the longitudinal extension L.

In these embodiments, the protective member 14 comprises a second tubular portion 15 extending around the first tubular portion 4. Moreover, the second tubular portion 15 extends along the at least one sensor 10 and along at least part of the at least one sensor signal line 12.

The second tubular portion 15 may be drawn onto the first tubular portion 4. Such drawing may be performed in a known manner. The first and second tubular portions 4, 15 being drawn through a die. As an alternative to drawing, the second tubular portion 15 may be shrink-fitted onto the first tubular portion 4. That is, the second tubular portion 15 is heated for it to expand and thereafter positioned around the first tubular portion 4, and then permitted to cool down. Such drawing and shrink-fitting are examples of manufacturing processes for securing the second tubular portion 15 to the first tubular portion 4.

The second tubular portion 15 may extend along at least part of the first tubular portion 4. Alternatively, the second tubular portion 15 may extend along substantially the entire first tubular portion 4, e.g. as shown in FIG. 1. An extension along at least part of, or along the entire, first tubular portion 4 is an extension along the longitudinal extension L.

Figure 2:
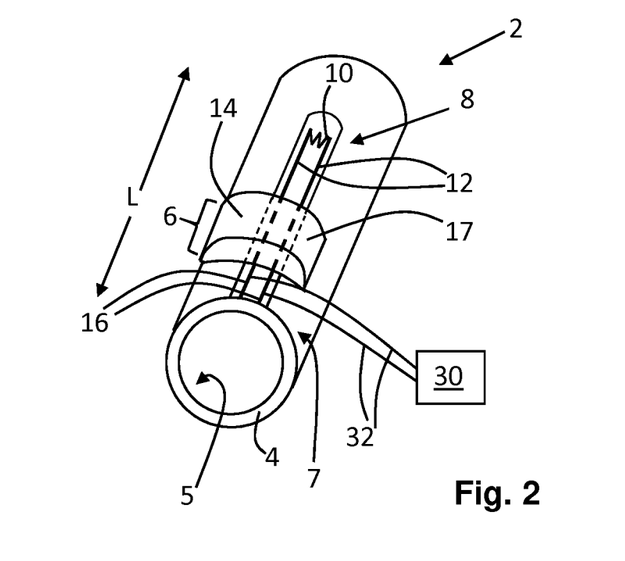

FIG. 2 illustrates a metallic tube structure 2 according to embodiments. These embodiments resemble in much the embodiments of FIG. 1. Accordingly, mainly the differences between these embodiments will be discussed in the following. Again, the metallic tube structure 2 has a longitudinal extension L and comprises a first tubular portion 4 having an inner surface 5 and an outer surface 7, and a sensor structure 8. Again, the sensor structure 8 comprises at least one sensor 10 and at least one sensor signal line 12. Also, the metallic tube structure 2 comprises a protective member 14.

In these embodiments, the protective member 14 comprises a segment element 17 extending partially around the first tubular portion 4. In comparison with the second tubular portion 15 of the embodiments of FIG. 1, the segment element 17 does not extend around the entire circumference of the first tubular portion 4.

Again, at least a portion of the sensor structure 8 is covered by the protective member 14, i.e. in these embodiments, the segment element 17. The segment element 17 is arranged in direct contact with at least a portion of the sensor structure 8 and at least a part of the first tubular portion 4. The segment element 17 extends a first distance 6 along the longitudinal extension L.

In these illustrated embodiments, the segment element 17 extends along a part of the sensor signal line 12 of the sensor structure 8. According to alternative embodiments, the segment element 17 may extend along the at least one sensor 10 and along at least part of the at least one sensor signal line 12.

The segment element 17 may extend along at least part of the first tubular portion 4, as in FIG. 2. Alternatively, the segment element 17 may extend along substantially the entire first tubular portion 4. An extension along at least part of, or along the entire, first tubular portion 4 is an extension along the longitudinal extension L.

The segment element 17 may be attached to the first tubular portion 4 in various automated manufacturing processes, such as by welding. Alternatively, if the segment element 17 extends more than 180 degrees around the first tubular portion 4, the segment element 70 may be shrink-fitted to the first tubular portion 4, as discussed above.

According to a further alternative embodiment, the segment element 17 may be formed by thermal spraying.

In a thermal spraying process a metal or metal alloy powder, with or without a liquid suspension, is sprayed on the relevant surface, in this case at least a portion of the sensor structure 8 and at least a part of the first tubular portion 4. The material forming the segment element 17 may be heated e.g. by means of plasma, an electric arc, or a combustion flame. As mentioned above, the material forming the protective member may comprise a metal or a metal alloy. The material is fed as a powder or in the form of a wire, cold or heated to a molten or semi-molten state. Small sized particles of the cold, molten or semi-molten material, e.g. in the order of a few or up to several m size, are accelerated towards the sensor structure and the first tubular portion. The particles primarily adhere mechanically to the surface of the first tubular portion 4 and the sensor structure 8. The segment element 17 is built up by spraying of one or more layers of particles. The sensor structure 8 and the first tubular portion 14 may be heated to a limited extent during the thermal spraying.

According to yet a further alternative embodiment, the segment element 17 may be formed by additive manufacturing, such as 3D printing.

Figures 3A, 3B, 4, 5:
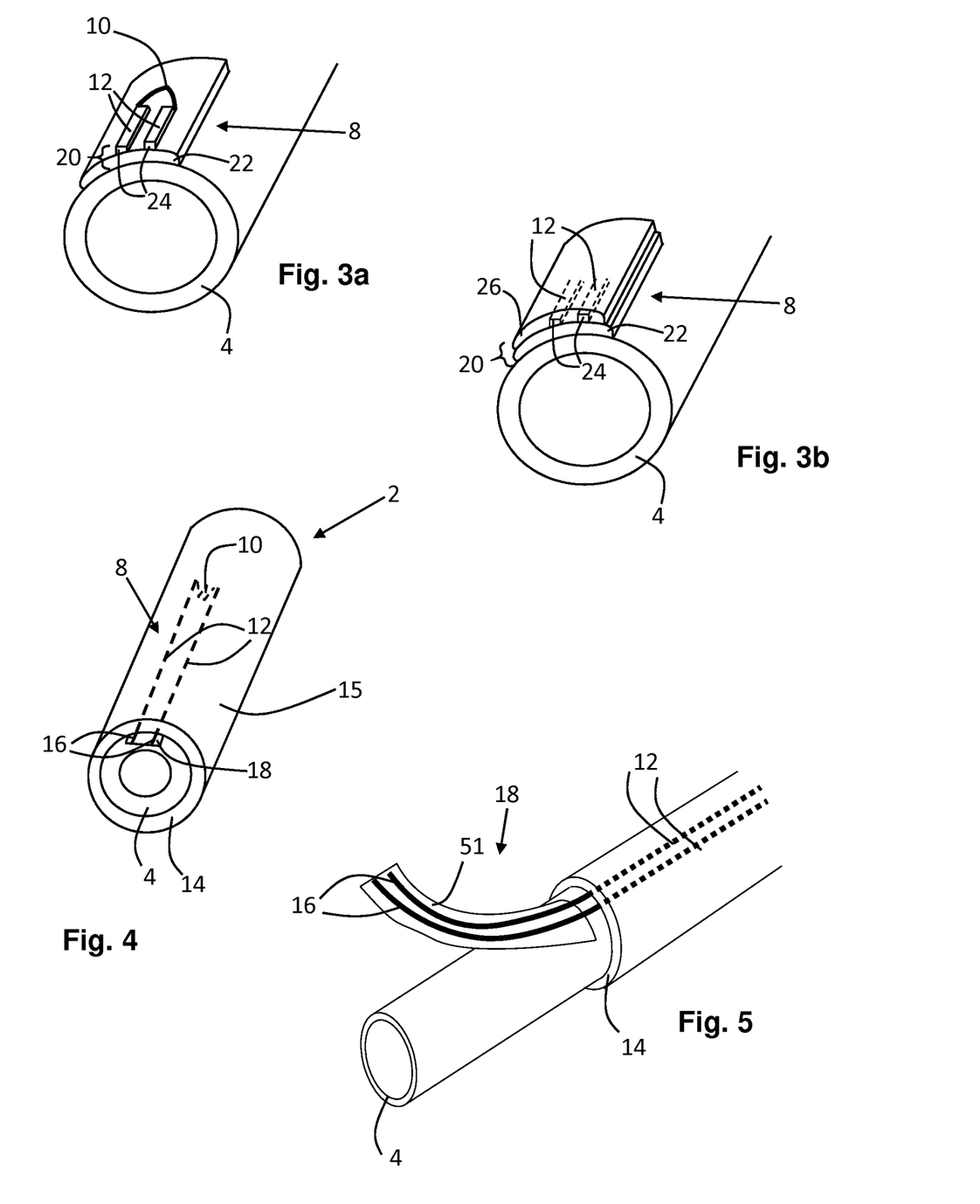
FIGS. 3a and 3b illustrate first tubular portions of metallic tube structures according to embodiments.
FIG. 4 illustrates a metallic tube structure according to embodiments.
FIG. 5 illustrates a metallic tube structure according to embodiments.

FIGS. 3a and 3b illustrate first tubular portions 4 of metallic tube structures according to embodiments. With reference to FIGS. 3a and 3b, the sensor structure 8 of this disclosure will be discussed in more detail.

The sensor structure 8 of this disclosure is formed as a stack 20 of thin-film layers. The stack 20 of thin-film layers comprises at least a first electrically insulating thin-film layer 22 and at least one electrically conducting thin-film layer 24, see FIG. 3a. The first electrically insulating thin-film layer 22 is arranged to electrically insulate the at least one electrically conducting thin-film layer 24 from the first tubular portion 4. The first insulating thin-film layer 24 may be a sandwich structure of one or more electrically insulating material layers.

The at least one sensor signal line 12 extends in the stack 20 of thin-film layers. For instance, the at least one sensor signal line 12 may be formed by the at least one electrically conducting thin-film layer 24. Moreover, the at least one sensor 10 may be formed by the at least one electrically conducting thin-film layer 24.

The stack 20 of thin-film layers may comprise one or more further electrically conducting thin-film layers besides the at least one electrically conducting thin-film layer 24. For instance, the at least one sensor signal line 12 may be formed by one electrically conducting thin-film layer, and the at least one sensor 10 may be formed by one or more different electrically conducting thin-film layers. For instance, if the at least one sensor 10 is a thermocouple, the at least one sensor 10 may comprise two different metallic thin-film layers.

The sensor structure 8 may comprise a second electrically insulating thin-film layer 26, see FIG. 3b. The second electrically insulating thin-film layer 26 is arranged between the protective member (not shown) and at least one of the at least one sensor 10 and/or the at least one sensor signal line 12 whereby an electrical insulator is formed between the protective member and the at least one sensor 10 and the at least one signal line 12. In the illustrated embodiments of FIG. 3b, this means that the second electrically insulating thin-film layer 26 is arranged between the protective member (not shown) and the at least one electrically conducting thin-film layer 24. In some areas, the second electrically insulating thin-film layer 26 is arranged on top of the first electrically insulating thin-film layer 22, and thus, in those areas arranged between the first electrically insulating thin-film layer 22 and the protective member (not shown).

According to some embodiments, the second electrically insulating thin-film layer 26 may also protect the at least one sensor 10 and/or the at least one sensor signal line 12. For instance, an oxide, such as e.g. $Al_2O_3$ (sapphire) or $SiO_2$, will provide electric insulation.

Also, the stack 20 of thin-film layers may comprise one or more further thin-film layers. For instance, a seed layer may be arranged between the first tubular portion 4 and the first electrically insulating thin-film layer 22. The seed layer may be electrically insulating, semi-conductive, or electrically conductive.

In FIGS. 3a and 3b, the thicknesses of the different layers 22, 24, 26 of the stack 20 of thin-film layers are greatly exaggerated.

As discussed above, since the sensor structure 8 of this disclosure is formed as a stack 20 of thin-film layers, the sensor structure 8 may be manufactured in an automated manufacturing process.

As discussed above, thin-film technology as such is well known and used for producing coatings and layers. In thin-film technology the different layers are deposited onto the base substrate, in this case the first tubular portion 4, and onto each other. The different thin-film layers may be formed for instance, by sputtering or evaporation under vacuum. A masking layer may be provided for shaping a subsequently applied thin-film layer, the masking layer being removed after the subsequent thin-film layer has been applied.

Mentioned as an example, each of the different thin-film layers of the stack 20 of thin-film layers may have a thickness within a range of 0.01-5 µm.

As an alternative to deposition by sputtering or evaporation, atmospheric thermal spraying may be utilised for forming the stack 20 of thin-film layers. An advantage with thermal spraying may be that the process does not have to be performed under vacuum, and thus may be less costly than sputtering or evaporation under vacuum. Masking would be performed by spraying through a shadow mask or selective laser etching.

Mentioned as an example, each of the different thin-film layers of the stack 20 of thin-film layers may have a thickness within a range of 10-200 m when the thin-film layers are formed by atmospheric thermal spraying.

The at least one electrically conducting thin-film layer 24 and any further electrically conducting thin-film layers comprise a metal or a metal alloy. The metal alloy may for instance comprise chromium.

According to some embodiments, the at least one sensor 10 may be composed of a metal alloy comprising chromium and palladium, or chromium and platinum, or chromium and nickel.

The first and second electrically insulating thin-film layer 22, 26, and any further electrically insulating thin-film layer may be composed of an oxide or a nitride. The oxide may for instance be selected from $Al_2O_3$ (sapphire) or $SiO_2$. The nitride may for instance be selected from $Si_3N_4$.

The at least one sensor 10 may for instance be utilised as a temperature sensor, a stress sensor, a strain gauge, a vibration sensor, a conductivity sensor, a pressure sensor, a magnetic field sensor, a heat flux sensor, a torque sensor, or a combination thereof. According to embodiments, the at least one sensor 10 may be selected from one of a resistive sensor, a capacitive sensor, a thermocouple, or a combination thereof.

The at least one sensor 10 accordingly, is connected to electronic equipment 30 configured to read the at least one sensor 10, see FIG. 2. The electronic equipment 30 may comprise a calculation unit which may take the form of substantially any suitable type of processor circuit or microcomputer, forming processing logic that may interpret and execute instructions. The electronic equipment 30 may comprise a memory unit. The calculation unit is connected to the memory unit, which provides the calculation unit with, for example, stored programme code and/or stored data which the calculation unit needs to enable it to do calculations. The calculation unit may also be adapted to storing partial or final results of calculations in the memory unit.

The electronic equipment 30 may be configured to interpret and/or present a signal read from the at least one sensor 10. For interpreting the signal read from the at least one sensor 10, the electronic equipment 30 may use its processing logic. For presentation purposes, the electronic equipment 30 may comprise an output device such as a display. The electronic equipment 30 may be connected to further equipment, such as process control equipment, which utilises the signal read from the at least one sensor 10 or the interpretation of the signal by the electronic equipment 30.

The electronic equipment 30 may be configured to compute data related to e.g. temperature, strain, vibrations, pressure over time. Thus, the electronic equipment 30 may provide formation related to e.g. fatigue.

For a signal from the at least one sensor 10 to reach the electronic equipment 30, and/or for the electronic equipment 30 to reply a signal, such as e.g. a voltage, to the at least one sensor 10, there are provided electrical conductors 32. Accordingly, the at least one sensor 10 is connected to the electronic equipment 30 via the at least one sensor signal line 12 and the electrical conductors 32. According to some embodiments, part of the connection between the at least one sensor signal line 12 and the electronic equipment 30 may be a wireless connection. That is, a wireless signal transmitter or transceiver is connected the at least one sensor signal line 12, and a wireless signal receiver or transceiver is connected to the electronic equipment 30. Wireless signal transmission between the wireless signal transmitter or transceiver and the wireless signal receiver or transceiver may be performed in any suitable known manner.

For the at least one sensor signal line 12 to be connected to the electrical conductors 32, a portion of the at least one sensor signal line 12 has to be exposed. Exposed, means here that the at least one sensor signal line 12 is uncovered/not covered and thus, accessible for establishing an electrical connection between the at least one sensor signal line 12 and the electrical conductors 32. Such an electrical connection may be achieved directly, e.g. by soldering the electrical conductors 32 to the at least one sensor signal line 12, or indirectly by providing electrical connectors at the at least one sensor signal line 12 and in turn connecting the electrical conductors 32 to the electrical connectors.

According to some embodiments, a portion of the at least one sensor signal line 12 being exposed means that a portion of the at least one electrically conducting thin-film layer 24 is exposed. That is, the at least one electrically conducting thin-film layer 24 is uncovered and accessible for establishing an electrical connection to the electrical conductors 32.

According to embodiments, an end portion 16 of the at least one sensor signal line 12 is exposed. Thus, the exposed end portion is accessible for connecting the at least one sensor signal line 12 to the electronic equipment 30. In FIGS. 1 and 2, the exposed end portions 16 of the at least one sensor signal line 12 are indicated.

In the embodiments of FIGS. 1 and 2, the end portion 16 of the at least one sensor signal line 12 is arranged exposed on the first tubular portion 4. In the embodiments of FIG. 1, the second tubular portion 15 extends only partially over the sensor structure 8, leaving end portions 16 of the at least one sensor signal line 12 exposed on the first tubular portion 4 adjacent to the second tubular portion 15. In the embodiments of FIG. 2, the segment element 17 covers only part of the at least one sensor signal line 12. Again, the end portion 16 of the at least one sensor signal line 12 is left exposed on the first tubular portion 4, in the exemplified embodiment at a distance from the segment element 17.

FIG. 4 illustrates a metallic tube structure 2 according to embodiments. These embodiments resemble in much the embodiments of FIG. 1. Accordingly, mainly the differences between these embodiments will be discussed in the following. Again, the metallic tube structure 2 comprises a first tubular portion 4 and a sensor structure 8 arranged on the outer surface of the first tubular portion 4. Again, the sensor structure 8 comprises at least one sensor 10 and at least one sensor signal line 12. Also, the metallic tube structure 2 comprises a protective member 14 in the form of a second tubular element 15.

In these embodiments, the sensor structure 8 is covered by the protective member 14, i.e. in these embodiments, by the second tubular element 15.

The sensor structure 8 comprises a contact member 18 extending from the metallic tube structure 2. A portion of the at least one sensor signal line 12 extends along the contact member 18. The end portion 16 of the at least one sensor signal line 12 is arranged exposed on the contact member 18. Thus, the exposed end portions 16 of the at least one sensor signal line 12 are accessible for connection to electronic equipment on the contact member 18.

FIG. 5 discloses an embodiment in which the contact member 18 comprise a metallic tongue 51 which in one end is attached to the outer surface of the first tubular element 4 and wherein the sensor signal line extends along the tongue and exposed end portions 16 of the at least one sensor signal line 12 are accessible for connection to electronic equipment. Thus, during manufacturing, the signal lines are formed in the thin-film stack which extends onto the tongue, which provides a flexible means for connection. The tongue may extend to an arbitrary length and thus providing cabling for high temperature operation of the metallic tube structure. The tongue 51 may be attached to the outer surface of the first tubular portion by means of spot welding or laser welding prior to forming the thin-film stack.

Further, a contact member 18 may be utilised also in connection with the embodiments of FIG. 2, the contact member 18 being arranged to at the protective member 14 in the form of the segment element 17. Similarly, the contact member 18 may be utilised in connection with embodiments comprising a protective member 14 in the form of a second tubular portion 14, which does not extend all the way to an end of the first tubular portion 4, as in the embodiments of FIG. 1. In such embodiments, the contact member 18 is provided alongside the first tubular portion 4, instead of at an end of the first tubular portion 4.

The present disclosure also relates to a method for manufacturing a metallic tube structure as defined hereinabove or hereinafter, wherein the method comprises steps of:
depositing the first electrically insulating thin-film layer 22 on the first tubular portion 4,
depositing at least one electrically conducting thin-film layer 24 onto the first electrically insulating thin-film layer 22,
defining the sensor structure 8 in the at least one electrically conducting thin-film layer 24
arranging the protective member 14 onto at least a portion of the sensor structure 8 and onto at least a part of the first tubular portion 4.

In order to facilitate good adherence between the first electrically insulating thin-film layer 22 and the outer surface 7 of the first tubular portion 4, the outer surface 7 of the first tubular portion 4 may be roughen up, for example by means of blasting or grinding. A metallic bonding layer may also be deposited on the rough outer surface of the first tubular portion 4. Such a metallic bonding layer may be formed by depositing a thin-film layer of chromium, or nickel-chromium. In order to facilitate high temperature operation no polymeric material may be used in the thin-film stack.

The step of defining the sensor structure by etching may involve laser etching. The laser etching may be selective and/or in combination with endpoint detection.

The method as defined above may also comprise, prior to the step of arranging the protective member 14, a further step of:
depositing a second electrically insulating thin-film layer 26 onto the at least one electrically conducting thin-film layer 24 and a portion of the first electrically insulating thin-film layer 22.

In one embodiment of the metallic tube structure, wherein the first tubular portion 4 is a functional tube i.e. a tube with a special purpose of transporting a fluid and/or carrying a load. If the first tubular portion is to be used in a pressurized operation the first tubular element 4 is dimensioned according to the relevant regulations associated with pressurized operation. On the outer surface of the first tubular portion 4 is the stack of thin-film layers formed, including the sensor structure 8. The sensors are preferably a temperature sensor and a strain gauge formed in the stack of thin-film layers. Further, the stack of thin-film layers comprises an outer layer of an electrically insulating thin-film layer 26. This allows a protective member in form of a protection tube to be drawn onto the first tubular portion and the stack of thin-film layers without short-circuiting the sensor and signal lines formed therein. Such a metallic tube structure may advantageously be used in a heating furnace for different purposes. For example, for monitoring the temperature and pressure in a tube in a water wall of a furnace. If $Al_2O_3$ is used as insulating layers similar heat transfer properties as stainless steel is achieved. Thus, the thin-film stack does not affect the heat transfer through the wall of the first tubular element. Further, $Al_2O_3$ has similar thermal expansion as steel which is advantageous since it limits the risk for cracks in the insulation layers due to different thermal expansion.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims. For instance, the metallic tube structure may have a different cross sectional shape than the herein shown circular cross sectional shape. The cross-sectional shape may for instance be oval, square, rectangular, triangular, any other polygonal shape. The second tubular portion 14 discussed in connection with the embodiments of FIG. 1 may be formed in a thermal spraying process, as discussed in connection with the embodiments of FIG. 2.

The invention claimed is:

1. A metallic tube structure having a longitudinal extension comprising:
    a first tubular portion having an inner surface and an outer surface, wherein the first tubular portion is made of a metal; and
    a sensor structure arranged on at least a first part of the outer surface of the first tubular portion,
    wherein the sensor structure comprises at least one sensor and at least one sensor signal line, the at least one sensor connected to the at least one sensor signal line, which at least one sensor is configured to detect a physical parameter of the first tubular portion,
    wherein the sensor structure extends in a longitudinal direction and in a direction of an axis of the first tubular portion,
    wherein the sensor structure is formed as a stack of thin-film layers,
    wherein the stack comprises at least a first electrically insulating thin-film layer and at least one electrically conducting thin-film layer,
    wherein the first electrically insulating thin-film layer is mechanically bonded to the outer surface of the first tubular portion,
    wherein at least the first electrically insulating thin-film layer is arranged to electrically insulate the at least one electrically conducting thin-film layer from the first tubular portion,
    wherein the at least one sensor signal line extends in the stack in the longitudinal direction, and
    wherein at least a portion of the sensor structure is covered by a protective member, the protective member being arranged in direct contact with the portion of the sensor structure and at least a second part of the first tubular portion.

2. The metallic tube structure according to claim 1, wherein the stack of thin-film layers further comprises a metallic bonding layer arranged between, and in contact with, the outer surface of the first tubular portion and the first electrically insulating thin-film layer.

3. The metallic tube structure according to claim 1, wherein a wall thickness of the first tubular portion is constant in a tangential direction of the first tubular portion.

4. The metallic tube structure according to claim 1, wherein the at least one sensor and the at least one signal line are both formed in the at least one electrically conducting thin-film layer.

5. The metallic tube structure according to claim 1, wherein the sensor structure comprises a second electrically insulating thin-film layer, and wherein the second electrically insulating thin-film layer is arranged between the protective member and at least one of the at least one sensor and the at least one sensor signal line whereby an electrical insulator is formed between the protective member and the at least one sensor and the at least one signal line.

6. The metallic tube structure according to claim 1, wherein the protective member comprises a second tubular portion extending around the first tubular portion, wherein the second tubular portion is made of a metal.

7. The metallic tube structure according to claim 6, wherein the second tubular portion covers substantially an entirety of the outer surface of the first tubular portion.

8. The metallic tube structure according to claim 6, wherein the second tubular portion is drawn onto the first tubular portion, or wherein the second tubular portion is shrink-fitted onto the first tubular portion.

9. The metallic tube structure according to claim 6, wherein the second tubular portion covers the at least one sensor and at least a part of the at least one sensor signal line.

10. The metallic tube structure according to claim 6, wherein the second tubular portion covers at least a part of the outer surface of the first tubular portion.

11. The metallic tube structure according to claim 1, wherein the protective member comprises a segment element extending partially around the first tubular portion.

12. The metallic tube structure according to claim 11, wherein the segment element covers substantially an entirety of the outer surface of the first tubular portion.

13. The metallic tube structure according to claim 11, wherein the segment element is formed by thermal spraying.

14. The metallic tube structure according to claim 11, wherein the segment element covers at least part of the outer surface of the first tubular portion.

15. The metallic tube structure according to claim 1, wherein an end portion of the at least one sensor signal line is exposed.

16. The metallic tube structure according to claim 15, wherein the end portion of the at least one sensor signal line is arranged exposed on the outer surface of the first tubular portion.

17. The metallic tube structure according to claim 15, wherein the sensor structure comprises a contact member extending from the metallic tube structure, wherein a portion of the at least one sensor signal line extends along the contact member, and wherein the end portion of the at least one sensor signal line is arranged exposed on the contact member.

18. The metallic tube structure according to claim 1, wherein the at least one sensor includes a resistive sensor, a capacitive sensor, or a thermocouple.

19. The metallic tube structure according to claim 1, wherein the at least one sensor comprises a thermocouple and a strain gauge.

20. The metallic tube structure according to claim 1, wherein the at least one sensor is composed of a metal alloy comprising chromium and palladium, or chromium and platinum, or chromium and nickel.

21. The metallic tube structure according to claim 1, wherein the first electrically insulating thin-film layer is composed of an oxide and/or a nitride.

22. A method of manufacturing the metallic tube structure of claim 1, wherein the method comprises steps of:
    depositing the first electrically insulating thin-film layer on the first tubular portion;
    depositing the at least one electrically conducting thin-film layer onto the first electrically insulating thin-film layer;
    defining the sensor structure either by etching or evaporating through a shadow mask the at least one electrically conducting thin-film layer; and
    arranging the protective member onto at least a portion of the sensor structure and onto at least a part of the first tubular portion.

23. The method of manufacturing a metallic tube structure according to claim 22, further comprising the step of:

depositing a metallic bonding layer onto the outer surface of the first tubular portion.

24. The method of manufacturing a metallic tube structure according to claim 22, wherein the step of arranging the protective member results in the protective member being in direct contact with at least a portion of the sensor structure and with at least part of the outer surface of the first tubular portion.

25. The method of manufacturing a metallic tube structure according to claim 24, wherein the step of arranging the protective member comprises drawing a second tubular portion onto the first tubular portion.

26. The method of manufacturing a metallic tube structure according to claim 24, wherein the step of arranging the protective member comprises thermal spraying of a metal, or an oxide, forming a segment element.

* * * * *